(12) United States Patent
Ku et al.

(10) Patent No.: US 10,996,913 B2
(45) Date of Patent: May 4, 2021

(54) MULTIMODAL DUAL DISPLAY

(71) Applicant: Intel Corporation, Santa Clara, CA (US)

(72) Inventors: Jeff Ku, Taipei (TW); Shantanu Kulkarni, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/581,593

(22) Filed: Sep. 24, 2019

(65) Prior Publication Data
US 2020/0019368 A1 Jan. 16, 2020

(51) Int. Cl.
*G06F 1/16* (2006.01)
*G06F 3/14* (2006.01)

(52) U.S. Cl.
CPC .......... *G06F 3/1446* (2013.01); *G06F 1/1626* (2013.01); *G06F 1/1647* (2013.01); *G06F 1/1654* (2013.01)

(58) Field of Classification Search
CPC .... G06F 1/1616; G06F 1/1626; G06F 1/1647; G06F 1/1654; G06F 1/1681; G06F 3/1446
See application file for complete search history.

(56) References Cited

U.S. PATENT DOCUMENTS

| | | | | |
|---|---|---|---|---|
| 6,628,244 | B1* | 9/2003 | Hirosawa | G06F 1/1626 345/1.1 |
| 8,971,029 | B2* | 3/2015 | Wong | G06F 1/1641 361/679.27 |
| 9,983,637 | B1* | 5/2018 | Morrison | G06F 1/1641 |
| 2011/0128216 | A1* | 6/2011 | Renwick | G06F 1/1641 345/156 |
| 2014/0240272 | A1* | 8/2014 | Huang | G09B 5/06 345/173 |
| 2016/0132075 | A1* | 5/2016 | Tazbaz | H04M 1/0216 361/679.27 |

* cited by examiner

*Primary Examiner* — Ram A Mistry
(74) *Attorney, Agent, or Firm* — Schwabe, Williamson & Wyatt, P.C.

(57) ABSTRACT

The present disclosure pertains to multimodal dual displays. A display apparatus comprises a first electronic display, a second electronic display, and a display attachment including a first region configured to attach to the first electronic display, a second region configured to attach to the second electronic display, and an intermediate region configured to change a distance between the first electronic display and the second electronic display. At least one releasable fastener is configured to releasably couple a first edge of the first electronic display to a second edge of the second electronic display. A second set of releasable fasteners is configured to releasably couple a third edge of the first electronic display to a fourth edge of the second electronic display when regions of the display attachment releasably detach from the displays, enabling the displays to rotate to achieve a different configuration and orientation with a different combined aspect ratio.

20 Claims, 8 Drawing Sheets

MULTIMODAL DUAL DISPLAY

BACKGROUND

The present disclosure relates to electronic display technology and in particular to dual display configurations.

Many computing devices include a display screen in order to present information to the user. Many users prefer displays to be larger or have a higher resolution in order to suit their intended use cases. However, displays that are larger and higher resolution may have disproportionally greater costs compared to smaller displays and displays with lower resolution. For this reason, some users opt for a multi-display configuration (e.g., dual-display, triple-display, etc.), which can provide a similar display size and/or resolution at reduced costs compared to single-display options. Some users prefer smaller multi-display devices over larger single display devices because they are more portable, as the displays can be layered on top of each other to provide a smaller package compared to a single larger display. However, such portable multi-display devices may provide hinges or other elements between the displays, creating a gap between the screens that may be detrimental to the user's experience.

SUMMARY

One embodiment provides a display apparatus comprising a first electronic display and a second electronic display. The display apparatus also comprises a display attachment. The display attachment includes a first region, a second region, and an intermediate region. The first region is configured to attach to a first surface of the first electronic display. The second region is configured to attach to a second surface of the second electronic display. The intermediate region is coupled to the first region and the second region. The intermediate region is configured to change a distance between a first edge of the first electronic display and a second edge of the second electronic display. The display apparatus further comprises a first set of releasable fasteners. The first set of releasable fasteners is configured to releasably couple the first edge of the first electronic display to the second edge of the second electronic display.

Another embodiment provides display attachment comprising a first region configured to attach to a first surface of a first electronic display. The display attachment also comprises a second region configured to attach to the second surface of the second electronic display. The display attachment also comprises an intermediate region connected to the first region and the second region. The intermediate region is configured to change a distance between a first edge of the first electronic display and a second edge of the second electronic display. The display attachment also comprises a first set of releasable fasteners. The first set of releasable fasteners are configured to releasably couple the first edge of the first electronic display to the second edge of the second electronic display.

The following detailed description and accompanying drawings provide a better understanding of the nature and advantages of the present disclosure.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident, based on the language of the different claims, that the claimed subject matter may include some or all of the features in these examples, alone or in combination, and may further include modifications and equivalents of the features and techniques described herein.

As discussed above, multi-display devices provide advantages over single-display devices because they more portable and can provide a similar screen size and/or resolution, when combined, at less cost. Furthermore, dual-display devices are useful in portable device configurations, as the displays can be layered, folded, or collapsed together to provide a smaller package compared to similar sized single displays. However, some such portable multi-display devices may provide hinges or other elements between the displays, creating a gap that may be detrimental to the user's experience.

The embodiments described herein provide advantages over prior dual-display devices while maintaining the advantages that they have over single-display devices. One embodiment provides a display apparatus comprises a first electronic display, a second electronic display, and a display attachment where an intermediate region of the display attachment is configured to change a distance between the first electronic display and the second electronic display. At least one releasable fastener is configured to releasably couple a first edge of the first electronic display to a second edge of the second electronic display. In some embodiments, the first set of releasable fasteners are magnets. These fasteners, or magnets, may be embedded in the edges of the display devices. The fasteners may fasten the displays together in a way that there is no additional elements or material between the edges of the display (e.g., the display attachment may not be between the edges of the displays). As mentioned above, prior dual-display devices may have a hinge situated between the displays, spacing the screens apart and thereby reducing the user's viewing experience. However, the dual-display apparatus described herein may move the display attachment behind the displays (e.g., towards the backside surface opposite of the screen) such that no hinge or elements of the display attachment are positioned between the two display devices.

Another embodiment further includes a second set of releasable fasteners that may be configured to releasably couple a third edge of the first electronic display to a fourth edge of the second electronic display. The second set of releasable fasteners may be positioned on or embedded in different edges of the two displays compared to the first set of releasable fasteners. For example, the first set of releasable fasteners may be positioned on or embedded in long edges of the two displays (e.g., right-side of the first display and left-side of the second display) while the second set of fasteners may be positioned on or embedded in short edges of the two displays (e.g., on the bottom edges). In this embodiment, certain regions of the display attachment may releasably detach from the first and second displays, enabling the displays to flip around towards the backside, in a separate orientation, while still being attached to the display attachment.

In one example, the two displays may have a 16:9 aspect ratio (e.g., in a horizontal orientation, which could be considered as a 9:16 aspect ratio if the display were positioned in a vertical orientation). In a first configuration, the long edges of the displays can be fastened together along the long edge (e.g., the "16" component of 16:9) such that a combination of the two displays has a 9:8 (e.g., 18:16) aspect ratio (e.g., 9+9=18 width by 16 height). This configuration may be referred to as a "landscape configuration."

In the landscape configuration, any gap between the display screens may be based on the size of the screen bezels (e.g., the housing surrounding the display between the screen and the edge of the display) but may not be based on the display attachment. In addition, the gap between the display screens may not be due to a portion of the releasable fastener extending the gap. Thus, one advantage over prior dual-display devices is that the gap may not be increased by a hinge or other element positioned between the displays. This advantage is achieved by the intermediate region of the display attachment moving out of the way towards the backside of the display devices. The landscape configuration is further described below with respect to FIGS. 1-5.

In a second configuration, the display attachment can be configured to rotate the two display devices around to create a combined display with a 32:9 aspect ratio (combining two 16:9 displays such that it is 16+16=32 width by 9 height). The display devices can be rotated to the second orientation by detaching the first set of fasteners, detaching certain detachable regions of the display attachment from the two displays while leaving other portions attached to the two displays, and fastening the second set of releasable fasteners together. This configuration may be referred to as a "panoramic configuration." Similar to the landscape configuration, any gap between the display screens may be based on the size of the screen bezels and the gap may not be due to the display attachment. Thus, one advantage over prior dual-display devices is that the gap may not be increased by a hinge or other element positioned between the displays. This advantage is achieved by the intermediate region of the display attachment moving towards the backside of the display devices. The panoramic configuration is further described below with respect to FIGS. 6-8.

As such, the multi-display device described herein can be configured in multiple orientations to provide multiple different aspect ratio displays (e.g., a display combined across the two screens of the two display devices). Accordingly, it may be referred to as a multimodal dual-display device. The multimodal dual-display device described herein provides the advantages of reduced cost, greater portability, a greater range of configurations and use cases compared to single-display devices, and the ability to change the aspect ratio of the combined display screens (e.g., the display output spanning across both screens of the dual-display device).

Recently, foldable display devices have become available. Foldable display may comprise a single screen that bends or folds along an axis. One advantage of a foldable display is that it can provide greater portability (e.g., reduced size compared to single-display devices) without a gap caused by screen bezels, as occurs with some dual-display devices. However, foldable devices have some disadvantages. For instance, foldable technology is not yet mature, and the costs are very high compared to dual-display devices and traditional single-display devices. In addition, the mechanical chassis design for certain foldable displays prevent the foldable display from being folded both ways (e.g., the screens may be folded to the inside or to the outside, but not both way). By contrast, the multimodal dual-display device described herein may be configured to fold both ways using a dual-axis hinge. In addition, the multimodal dual display device described herein can be positioned in different configurations to provide different aspect ratio displays. A single foldable display cannot change configurations to provide different aspect ratios as can the multimodal dual display described here.

The embodiments described herein address the disadvantages in prior single-display, dual-display, and foldable display devices while providing new functionality for configuring the display devices in different orientations and providing different aspect ratio displays. As such, the multimodal dual display device described herein provides advantages that cannot be achieved by single-display devices or foldable display devices.

Figure 1:
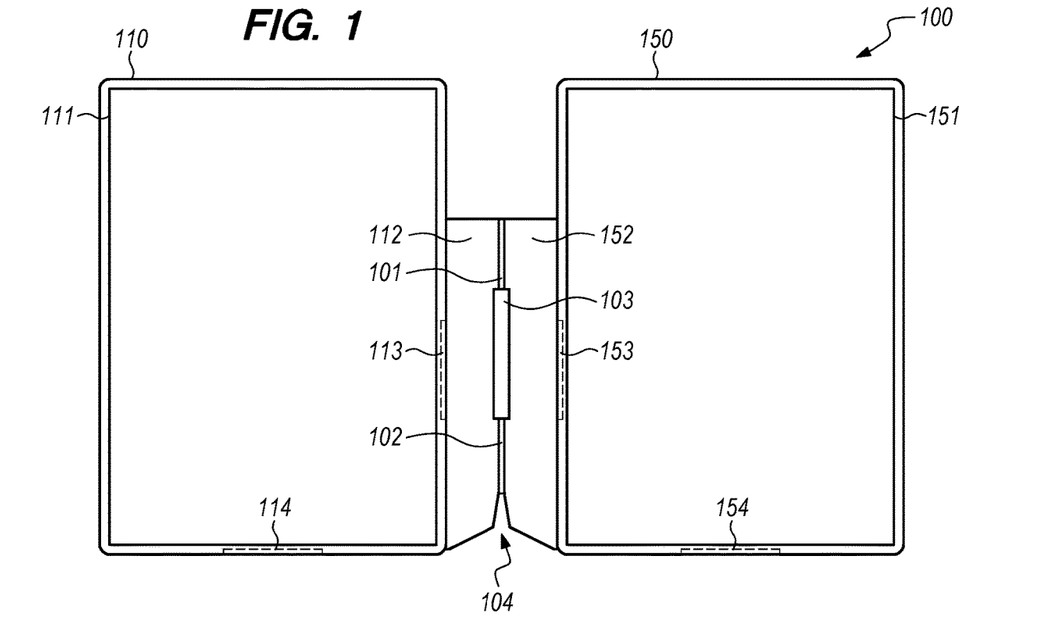
FIG. 1 illustrates a front view of an exemplary display apparatus including a display attachment and two electronic displays, according to an embodiment.

FIG. 1 illustrates a front view of an exemplary display apparatus 100 including a display attachment and two electronic displays, according to an embodiment. The display apparatus 100 includes a first electronic display 110 having a first screen 111 and a second electronic display 150 having a second screen 151. In FIG. 1, the display apparatus 100 is shown as if it was laying down flat. The display apparatus may be configured into different positions as well, some of which are shown in other figures.

As noted above, the display apparatus 100 includes the first electronic display 110 and the second electronic display 150. One or both of the first electronic display 110 and the second electronic display 150 may include one or more processors and system memory. One or both of the first electronic display 110 and the second electronic display 150 may be tablet computers, for example. The first electronic display 110 and the second electronic display 150 may be electronically coupled (e.g., by one or more wires and/or flexible circuit boards). As such, a video display may be output across both the first screen 111 of the first electronic display 110 and the second screen 151 of the second electronic display 150.

The electronic displays may be liquid-crystal displays (LCD), electronic paper displays (e.g., E-ink displays), light-emitting diode (LED) based displays, or organic light-emitting diode (LED) based displays, for example. In some embodiments, other types of displays may be used. In some embodiments, the first electronic display 110 and the second electronic display 150 may both be the same type of display (e.g., both are LED displays). In some embodiments, the first electronic display 110 and the second electronic display 150 may be different types of displays (e.g., one may be an LED display and the other may be an electronic paper display). In some embodiments, one or more of the electronic displays may provide a virtual keyboard and trackpad for typing, pointing, and providing other user input.

The display attachment of the display apparatus 100 comprises a first region 115 (not shown in FIG. 1, see FIG. 2) configured to attach to a first surface of the first electronic display 110. In some embodiments, the first surface may be a backside of the first electronic display, with respect to the first screen 111. The display attachment further comprises a second region 155 (not shown in FIG. 1, see FIG. 2) configured to attach to a second surface of the second electronic display 150. In some embodiments, the second surface may be a backside of the second electronic display, with respect to the second screen 151.

In the embodiment shown in FIG. 1, the intermediate region includes a first intermediate region 112, a second intermediate region 152, a first hinge 101, and a second hinge 102. The intermediate region may be configured to change a distance between a first edge of the first electronic display 110 and a second edge of the second electronic display 150, as further described below. In some embodiments, the intermediate region does not contain hinges. In some embodiments, the intermediate region comprises folds instead of hinges. To change the distance between the first edge of the first electronic display 110 and the second edge of the second electronic display 150, the intermediate region of the display attachment can include one or more folds or a hinges so that it can move to the backside of the displays when the two displays are brought together. As such, the intermediate region may not provide a gap between the two electronic displays when the electronic displays are fastened together, as further described below.

As shown in FIG. 1, the intermediate region may be defined by a first cutout section 103 and a second cutout section 104. The first cutout section 103 may be result of space provided for rotation of the first hinge 101 and the second hinge 102. The first cutout section 103 may also provide space for wires or flexible circuit boards to pass through to connect the first electronic display 110 and the second electronic display 150. In some embodiments, the intermediate region may not contain the first cutout section 103. The second cutout section 104 may be cut at an angle with respect to edges of the two electronic display 110, 150. The second cutout section 104 may be configured to act as a stand to hold the two electronic display 110, 150 upright at the angle (e.g., depending on the angle of the second cutout section 104), as further discussed below.

The display apparatus 100 further comprises a first set of releasable fasteners configured to releasably couple the first edge of the first electronic display 110 to the second edge of the second electronic display 120. In the embodiment shown in FIG. 1, the first set of releasable fasteners includes a first fastener 113 and a second fastener 153. In some embodiments, the first set of releasable fasteners includes a first magnet and a second magnet configured to couple with the first magnet. That is, the first fastener 113 and the second fastener 153 may be magnets. In some embodiments, one of the fasteners may be a magnet and the other may be ferromagnetic material.

The first fastener 113 may be mounted on or embedded in the first edge of the first electronic display 110. In some embodiments, the first edge may be a thin edge of a case, housing, or bezel of the first electronic display 110. In some embodiments the first fastener 113 may be mounted on a backside of the first electronic display 110, along or next to the first edge, for example. In some embodiments, where the first set of fasteners includes magnets, the first magnet may be mounted on or embedded in the first edge of the first electronic display (e.g., the thin edge), and the second magnet may be mounted on or embedded in the second edge of the second electronic display (e.g., the thin edge). In some embodiments, the first magnet and the second magnet are electromagnetic.

The second fastener 153 may be mounted on or embedded in the second edge of the second electronic display 150. In some embodiments, the second edge may be a thin edge of the case, housing, or bezel of the second electronic display 150. In some embodiments the second fastener 153 may be mounted on a backside of the second electronic display 150, along or next to the second edge, for example.

In some embodiments, the first set of releasable fasteners may include a latch mechanism or a catch mechanism. For example, a first part of the mechanism on one of the displays may fasten with a second corresponding part of the mechanism on the other display such that displays are attached together. In some embodiments, the latch mechanism or the catch mechanism can be unfastened by applying pressure to a portion of the latch mechanism or the catch mechanism. In other embodiments, the first set of releasable fasteners may be other fastening mechanisms.

The display apparatus further comprises a second set of releasable fasteners 114, 154 configured to releasably couple a third edge of the first electronic display 110 to a fourth edge of the second electronic display 120. In some embodiments, the second set of releasable fasteners 114, 154 may be configured similar to the first set of releasable fasteners 113, 153. In some embodiments, the second set of releasable fasteners 114, 154 may be configured different from the first set of releasable fasteners 113, 153. For example, the first set of releasable fasteners may be a different type of fastener compared to the second set of releasable fasteners.

In the embodiment shown in FIG. 1, the second set of releasable fasteners includes a third fastener 114 and a fourth fastener 154. In some embodiments, the second set of releasable fasteners includes a third magnet and a fourth magnet configured to couple with the third magnet. That is, the third fastener 114 and the fourth fastener 154 may be magnets.

The third fastener 114 may be mounted on or embedded in the third edge of the first electronic display 110. As shown in FIG. 1, the first set of releasable fasteners may be positioned along the long side of the electronic displays 110, 150 while the second set of releasable fasteners is positioned along a short side of the electronic display 110, 150.

In some embodiments, the third edge may be a thin edge of the case, housing, or bezel of the first electronic display 110. In some embodiments the first fastener 113 may be mounted on a backside of the first electronic display 110, along or next to the third edge, for example. In some embodiments, where the second set of fasteners includes magnets, the third magnet may be mounted on or embedded in the third edge of the first electronic display (e.g., the thin edge), and the fourth magnet may be mounted on or embedded in the fourth edge of the second electronic display (e.g., the thin edge). In some embodiments, the third magnet and the fourth magnet are electromagnetic. In some embodiments, the second edge may be a thin edge of the case, housing, or bezel of the second electronic display 150. In some embodiments the second fastener 153 may be mounted on a backside of the second electronic display 150, along or next to the second edge, for example.

In some embodiments, the second set of releasable fasteners may include a latch mechanism or a catch mechanism. For example, a first part of the mechanism on one of the displays may fasten with a second corresponding part of the mechanism on the other display such that displays are fastened together. In some embodiments, the latch mechanism or the catch mechanism can be unfastened by applying pressure to a portion of the latch mechanism or the catch mechanism. In other embodiments, the second set of releasable fasteners may be other fastening mechanisms As mentioned above, the intermediate region may be configured to change a distance between a first edge of the first electronic display 110 and a second edge of the second electronic display 150. As the distance between the first edge and the second edge becomes smaller, the distance between the fasteners of the first set of releasable fasteners becomes smaller until the fasteners can fasten together, as further described below. The first set of releasable fasteners may releasably couple (e.g., be magnetically attached) such that the first edge of the first electronic display is fastened flush against and in contact with the second edge of the second electronic display. As such, the edges of the electronic display may be touching such that the screens of the displays appear as a single screen, except for any gap provided by the bezels of the electronic display devices.

In addition, some embodiments of the display apparatus discussed herein can change the orientation of the displays to provide multiple possible aspect ratios when combining the displays. For example, the display apparatus can have a first configuration where two 16:9 aspect ratio electronic displays are brought together along their long-side (e.g., the "16" side in 16:9) using the display attachment to form a combined 9:8 (e.g., 18:16) aspect ratio display extending across both electronic displays. In this example, the two short edges of the display (e.g., the "9" side in 16:9) would form the bottom and top edges of the display. Another example display apparatus may include two 4:3 aspect ratio displays, and these displays may be brought together to form a combined 3:2 aspect ratio display. Another example display apparatus may include two 3:2 aspect ratio displays, and these displays may be brought together to form a combined 4:3 aspect ratio display. This configuration may be referred to as a "landscape configuration." A dual-display in landscape configuration may provide a combined display having a length greater than its height. As used herein, "aspect ratio" generally refers to the proportional relationship of the width to the height.

In addition, the display apparatus can also have a second configuration where the display attachment converts such that the two 16:9 aspect ratio electronic displays are brought together along their short-side to form a combined ultra-wide 32:9 aspect ratio display (e.g., a "panoramic" configuration) extending across both electronic displays, for example. In other embodiments, other aspect ratio displays can be used and combined to form other combined aspect ratios.

Figure 6:
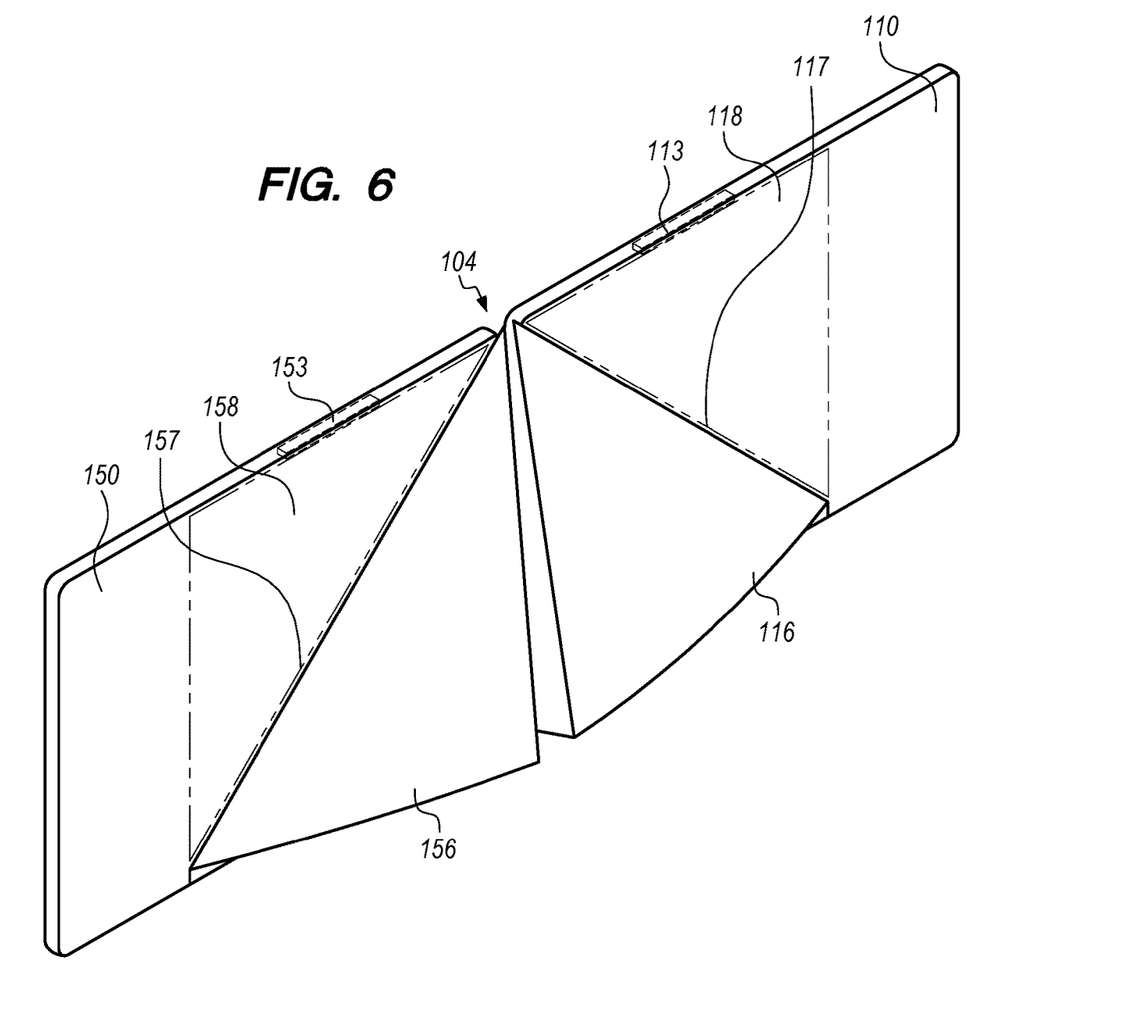
FIG. 6 illustrates a back view of the display apparatus of FIG. 1 after converting to a panoramic configuration, according to an embodiment.
Figure 7:
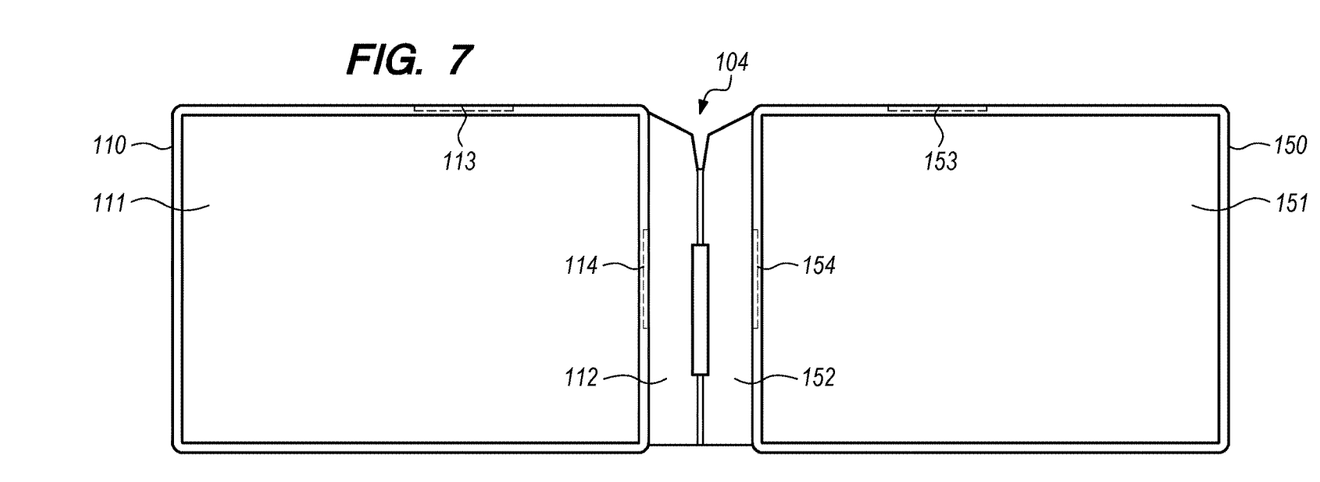
FIG. 7 illustrates a front view of the display attachment and the two electronic displays of FIG. 1 when laid flat from the panoramic configuration of FIG. 6, according to an embodiment.

FIGS. 6 and 7 illustrate different views of the display apparatus and the two displays converted into the ultra-wide panoramic configuration. Prior dual-displays and foldable displays are not capable of converting from one combined aspect ratio to a different combined aspect ratio. Of course, single displays (e.g., single foldable displays) have a set aspect ratio and prior dual-display devices do not offer such configurations.

Converting between different aspect ratios is advantageous because different aspect ratios are better for different applications and uses. For example, a "landscape" display (e.g., having a 3:2, 4:3, or 9:8 aspect ratio) may be better suited for reading or web browsing applications while ultra-wide "panoramic" display (e.g., having an 8:3, 3:1, or 32:9 aspect ratio) may be better suited for productivity, presentation, and gaming applications. The display attachment described herein provides this advantage.

Accordingly, when the first electronic display 110 and the second electronic display 150 may be brought together, providing a single virtual display across the first screen 111 and the second screen 151. As discussed above, the intermediate region may be positioned on a backside of the electronic displays (e.g., by folding along the hinges) such that it does not provide or contribute towards a gap between the first electronic display 110 and the second electronic display 150. As such, the display apparatus described herein overcomes some of the disadvantages of prior dual-display devices (e.g., the gap created by the hinge) while maintaining some of the advantages that dual-display devices have over foldable display devices (e.g., dual-display devices can fold both ways using a dual-axis hinge while foldable displays cannot).

The positioning and configuration of the electronic displays and the display attachment is further described below.

Figure 2:
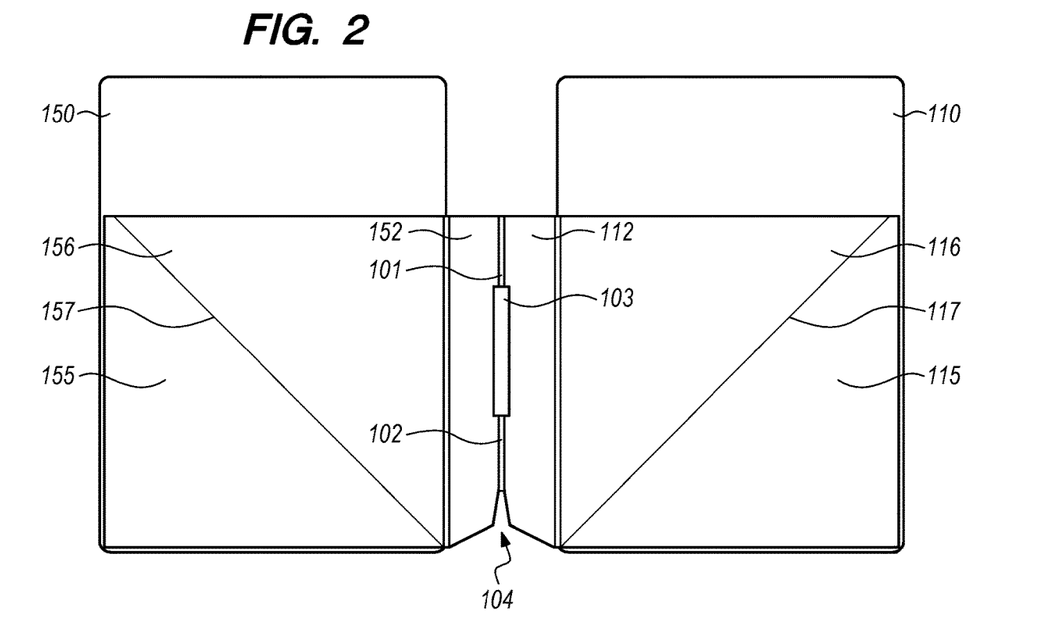
FIG. 2 illustrates a back view of the display apparatus of FIG. 1, according to an embodiment.

FIG. 2 illustrates a back view of the display attachment 100 and the two electronic displays 110, 150 of FIG. 1, according to an embodiment. As shown in FIG. 2, the display attachment 100 is configured in a flat position. The display attachment 100 includes a first region 115, a second region 155, a third region 116, and a fourth region 156.

The first region 115 may be configured to attach to a portion of a first surface of the first electronic display. The first surface may be a backside of the first electronic display 110 (e.g., the backside with respect to the first screen 111). In some embodiments, the first region 115 may be attached to a portion of the first surface using adhesive or epoxy, for example. In some embodiments the first region 115 may be permanently attached to the backside of the first electronic display 110.

The second region 155 may be configured to attach to a portion of second surface of the second electronic display. The second surface may be a region of a backside of the second electronic display 150 (e.g., the backside with respect to the first screen 151). In some embodiments, the second region 155 may be attached to a portion of the second surface using adhesive or epoxy, for example. In some embodiments the second region 155 may be permanently attached to the backside of the second electronic display 150.

The third region 116 may be configured to releasably detach from the first surface (e.g., the backside surface) of the first electronic display 110. In some embodiments, at least a part of the first surface may be magnetic or ferromagnetic and the third region 116 may include magnets that can be releasably detached from the first surface. The display attachment may include a first fold-line 117 between the first region 115 and the third region 116 such that the first region 116 can be bent backwards towards the third region 116 along the first fold-line 117, or vice versa. For example, the third region 116 may be configured to releasably detach from the first surface of the electronic display 110 when the first electronic display 110 is rotated along the first region 115 and the third region 116 (e.g., folding the display attachment along the first fold-line 117).

The fourth region 156 may be configured to releasably detach from the second surface (e.g., the backside surface) of the second electronic display 150. In some embodiments, at least a part of the second surface may be magnetic or ferromagnetic and the fourth region 156 may include magnets that can be releasably detached from the second surface. The display attachment may include a second fold-line 157 between the second region 155 and the fourth region 156 such that the second region 156 can be bent backwards towards the fourth region 156 along the second fold-line 157, or vice versa. For example, the fourth region 156 may be configured to releasably detach from the second surface of the electronic display 110 when the second electronic display 110 is rotated along the second region 155 and the fourth region 156 (e.g., folding the display attachment along the second fold-line 157).

Figure 3:
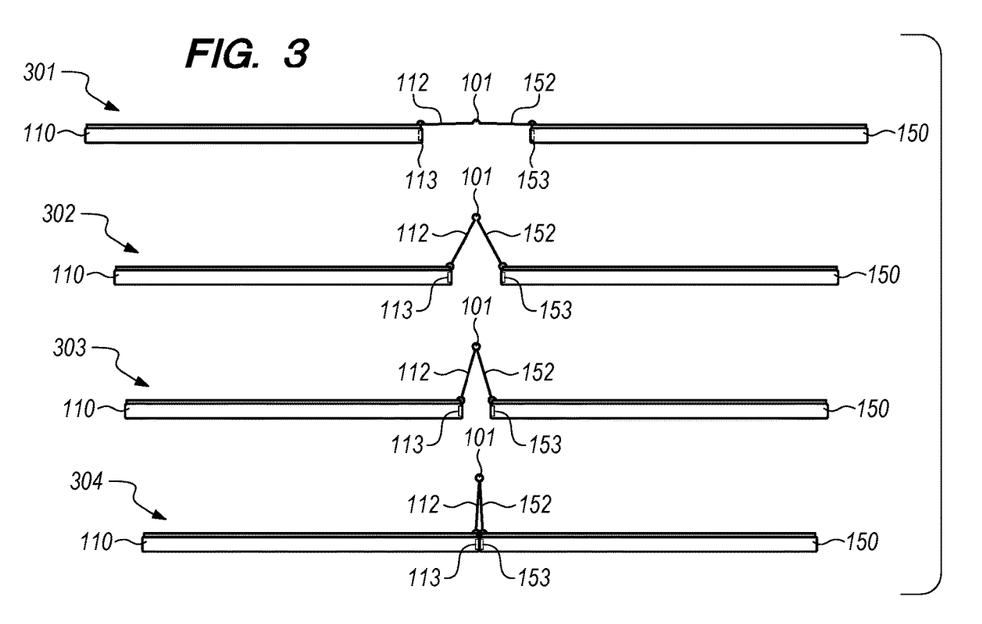
FIG. 3 illustrates a top-down view of the display apparatus of FIG. 1, according to an embodiment.

FIG. 3 illustrates a top-down view of the display attachment 100 and the two electronic displays 110, 150 of FIG. 1, according to an embodiment. FIG. 3 shows the display attachment 100 changing the distance between the first electronic display 110 and the second electronic display 150 in four different views 301, 302, 303, and 304. The display apparatus is converted from flat configuration a landscape configuration using the first hinge 101 and the second hinge 102 (not shown in FIG. 3). While not shown in FIG. 3, the second hinge 102 may be configured and positioned similar to the first hinge 101 in each of the four views 301, 302, 303, and 304.

In the first view 301 of FIG. 3 (going from the top view to the bottom of FIG. 3), the hinge 101 is opened flat, and the first intermediate region 112 and the second intermediate region 152 and substantially parallel (as shown in view 301 of FIG. 3) to the first electronic display 110 and the second electronic display 150.

As shown in the second view 302 of FIG. 3, the hinge 101 is partially closed and the distance between the first electronic display 110 and the second electronic display 150 has decreased compared to the first view 301 of FIG. 3. In addition, a distance between the edges of the first intermediate region 112 and the second intermediate region 152, which are attached to the third region 116 and the fourth region 156, respectively, is decreased. As shown in the second view 302 of FIG. 3, the intermediate region of the display attachment is positioned towards a backside of the two electronic displays such that the intermediate region is not positioned directly between the thin edges of the electronic displays. In some embodiments, the display attachment may include a third fold-line between the first intermediate region 112 and third region 116 and a fourth fold-line between the second intermediate region 152 and the fourth region 156 such that the intermediate region moves towards the backside of the displays. In some embodiments, the display attachment may include a third hinge between the first intermediate region 112 and third region 116 and a fourth hinge between the second intermediate region 152 and the fourth region 156 to align the intermediate region backwards as shown.

The third view 303 of FIG. 3 shows the first electronic display 110 and the second electronic display 150 coming closer together. When the distance between the first electronic display 110 and the second electronic display 150 is less than a certain threshold, the first set of releasable fasteners 113, 153 will fasten together. For example, in an embodiment where the first fastener 113 and the second fastener 153 are magnets, the magnets may attract each other and fasten the edge of the first electronic display 110 to the edge of the second electronic display. This is shown in the fourth view 304. In embodiments where the first fastener 113 is a latching mechanism and the second fastener 153 is a catch mechanism, the latching mechanism may catch onto the catching mechanism to fasten together.

Figure 4:
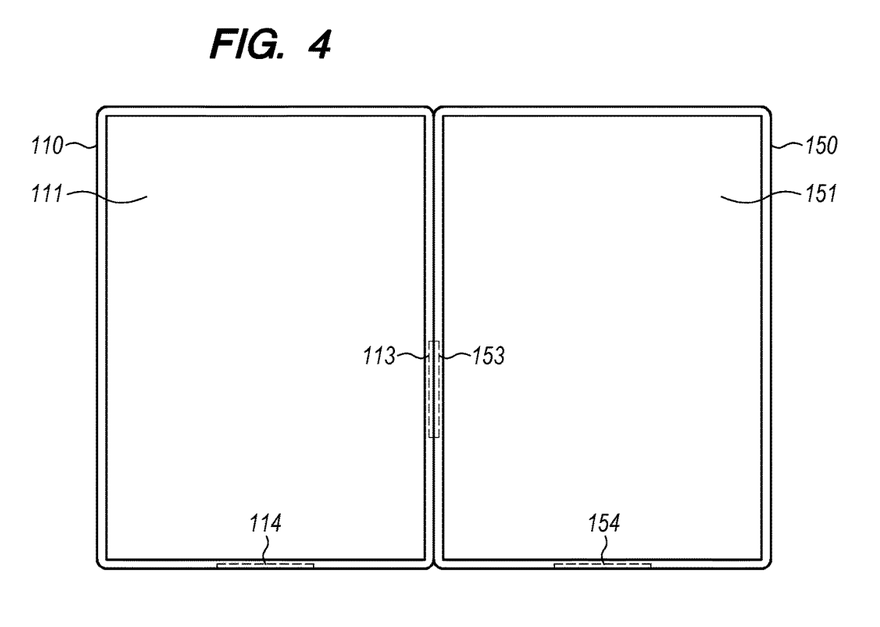
FIG. 4 illustrates a front view of the display apparatus of FIG. 1 in a landscape configuration, according to an embodiment.

As shown in the fourth view 304 of FIG. 4, the hinge 101 has closed at an angle to cause the first set of releasable fasteners to releasably couple together such that the first edge (e.g., the thin edge) of the first electronic display 110 is fastened flush against and in contact with the second edge (e.g., the thin edge) of the second electronic display 150. The intermediate region of the display attachment is positioned behind the display such that it does not provide or contribute to a gap between the two electronic display.

As shown in the fourth view 304 of FIG. 3, the two electronic displays 110 and 150 are configured in a landscape configuration with the edges of the two electronic displays 110, 150 being fastened together. Advantageously, in this configuration a display can be output across both the first screen 111 and the second screen 151 in an aspect ratio based on the combination of the screens. For example, if each of the displays has 9:16 aspect ratio when vertical (e.g., 9:16 when vertical as shown or 16:9 when horizontal), then the combined screens in landscape configuration can provide an effective 9:8 (e.g., 18:16) aspect ratio.

FIG. 4 illustrates a front view of the display attachment and the two electronic displays of FIG. 1 in a landscape configuration, according to an embodiment. The front view of FIG. 4 corresponds to the fourth top-down view 304 of FIG. 3. As shown in FIG. 4, the first fastener 113 and the second fastener 153 of the first set of releasable fasteners are releasably coupled together such that the edge of the first electronic display 110 is fastened flush against and in contact with the edge of the second electronic display 150. As mentioned above, this configuration may be referred to as a landscape configuration. In this configuration, the first screen 111 and the second screen 151 may not be separated by the display attachment. That is, the display attachment may not provide or contribute to a gap between the first screen 111 and the second screen 151. In the embodiments shown in FIG. 4, only a first bezel of the first electronic display 110 and a second bezel of the second electronic display 150 provide a gap between the first screen 111 and the second screen 151.

As discussed above, the configuration of the first electronic display 110 and the second electronic display 150 shown in FIG. 4 is advantageous because it provides a larger display (e.g., size and resolution) while allowing for the two electronic displays to be folded together (e.g., screen facing each other as a book) for space saving and portability, without increasing a gap between the display 111, 151.

Figure 5:
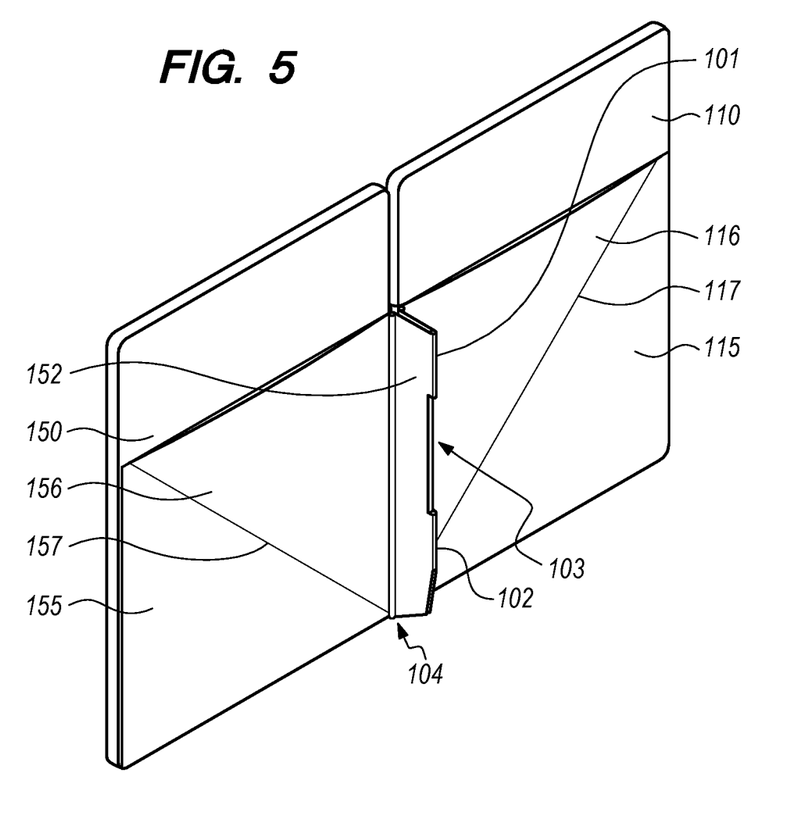
FIG. 5 illustrates a back view of the display apparatus of FIG. 1 in a landscape configuration as shown in FIG. 4, according to an embodiment.

FIG. 5 illustrates a back view of the display attachment and the two electronic displays of FIG. 1 in a landscape configuration as shown in FIG. 4, according to an embodiment. As discussed above, the intermediate region (including the first intermediate region 112, the second intermediate region 152, the first hinge 101, and the second hinge 102), may be positioned towards a backside of the two electronic displays 110, 150.

The second cutout section 104 of the display attachment may be defined by an angle such that the display attachment as positioned in the landscape configuration can act as a stand. As such, the two electronic displays can be leaned back and supported by the intermediate region along the second cutout section 104 at that angle.

As shown in FIG. 5, the third region 116 and the fourth region 156 may be attached to the first electronic display 110 and the second electronic display 150, respectively, in the landscape configuration. However, as discussed above, the third region 116 and the fourth region 156 can be detached and the two electronic displays 110, 150 can be converted into a panoramic configuration.

In order to convert to the panoramic configuration, the third region 116 and the fourth region 156 may detach from the first electronic display 110 and the second electronic display 150, respectively, thereby enabling the two electronic displays to rotate around (e.g., along the first fold-line 117 and the second fold-line 157, respectively). As part of this conversion, the first set of releasable fasteners 113, 153 release from each other and the second set of releasable fasteners 114, 154 attach to each other.

As such, the display attachment can fold or bend to such that the third edge of the first electronic display 110 and the fourth edge of the second electronic display 150 are brought closer together, thereby enabling the second set of releasable fasteners 114, 154 to fasten together. FIG. 6 shows the folding or bending of the display attachment used to achieve the panoramic configuration.

FIG. 6 illustrates a back view of the display apparatus of FIG. 1 after converting to a panoramic configuration, according to an embodiment. As shown in FIG. 6, the third region 116 has releasably detached from a first portion 118 of the first electronic display. As discussed above, the third region 116 of the display attachment may be configured to releasably attach and detach from the first electronic display 110. In the embodiment shown in FIG. 6, the third region 116 detaches from the first portion 118 of the first electronic display 110. In some embodiments, at least one of the third region 116 and the first portion 118 of the first electronic display 110 may be magnetic and the other may be magnetic or ferromagnetic, thereby enabling releasable attachment and detachment. In other embodiments, the third region 116 and the first portion 118 of the first electronic display 110 releasably attach and detach by other mechanisms (e.g., a latch and catch mechanism, adhesive, or a hook and loop fastener).

Also shown in FIG. 6 is that the fourth region 156 has releasably detached from a second portion 158 of the second electronic display. As discussed above, the fourth region 156 of the display attachment may be configured to releasably attach and detach from the second electronic display 150. In the embodiment shown in FIG. 6, the fourth region 156 detaches from the first portion 118 of the second electronic display 150. In some embodiments, at least one of the fourth region 156 and the second portion 158 of the second electronic display 150 may be magnetic and the other may be magnetic or ferromagnetic, thereby enabling releasable attachment and detachment. In other embodiments, the fourth region 156 and the second portion 158 of the second electronic display 150 releasably attach and detach by other mechanisms (e.g., a latch and catch mechanism, adhesive, or a hook and loop fastener).

As shown in FIG. 6, the display apparatus is converted from the landscape configuration to the panoramic configuration by folding rotating the electronic displays 110, 150 along the fold-lines 117, 157. In the panoramic configuration, the first edge of the first electronic display 110, which includes the first fastener 113, becomes the top side of the first electronic display 110. Similarly, the second edge of the second electronic display 150, which includes the second fastener 153, becomes the top side of the second electronic display 150, as shown in FIG. 6. As part of converting to the panoramic mode, the second set of releasable fasteners 114, 154 are configured to fasten together when moved closer together by the first hinge 101 and second hinge 102 of the intermediate region.

In the panoramic configuration, the display attachment does not provide or contribute to a gap between the first electronic display 110 and the second electronic display 150. As shown in FIG. 6, the display attachment is on a backside of the electronic displays 110, 150. For example, the second cutout section 104 of the display attachment prevents the display attachment from being positioned between the two electronic displays 110, 150 when the third region 116 and fourth region 156 are pulled back, away from the electronic displays 110, 150. That is, the display attachment is not positioned between the two electronic displays 110, 150 because a portion that would be positioned there has been cut out (e.g., the second cutout section 104). As shown in FIG. 6, the third region 116 and fourth region 156, along with the intermediate portion of the display attachment, may be used as a stand to hold the two electronic displays 110, 150 upright at an angle when in the panoramic configuration.

As discussed above, the display attachment described herein is advantageous because it enables the dual-display device to convert the screens 111, 151 from one aspect ratio to another aspect ratio. As discussed above, the screens 111, 151 of both of the electronic displays 110, 150 may have 16:9 aspect ratio and in the landscape configuration a display spanning across both screens 111, 151 may have a 9:8 aspect ratio. In this example, the screens 111, 151 of the two electronic displays 110, 150 in the panoramic configuration can provide a combined display having a 32:9 aspect ratio. The wide aspect ratio provided by the panoramic configuration may be more useful for gaming, presentation, and productivity applications, for example, while the less wide aspect ratio provided by the landscape configuration may be more useful for reading electronic books or browsing websites. Thus, the display attachment described herein improves upon prior dual display configurations because it enables two display to provide different aspect ratios while keeping the two displays connected together (e.g., via the display attachment) for portability and east of transport. And this is done without the display attachment providing or contributing to a gap between the displays when they are being used (e.g., the display attachment is behind the displays as shown in FIGS. 5 and 6).

For example, the first electronic display may comprise a first display screen having a first aspect ratio including a first horizontal component (e.g., the "16" in a 16:9 aspect ratio) and a first vertical component (e.g., the "9" in a 16:9 aspect ratio). The first electronic display may comprise a third edge that is longer in length than a first edge of the first electronic display (e.g., the display is not a square but has one side longer than the other). Similarly, the second electronic display may comprise a second display screen having a second aspect ratio including a second horizontal component and a second vertical component. Similar to the first electronic display, the second electronic display further comprises a fourth edge longer in length than the second edge of the second electronic display. The first electronic display and the second electronic display can be configured in a plurality of configurations, such as the landscape configuration and the panoramic configuration discussed herein.

In a first configuration (e.g., the landscape configuration), the first set of releasable fasteners may be coupled such that the first edge of the first electronic display and the second edge of the second electronic display are touching. In this configuration, the intermediate region may be positioned at a backside with respect to the first display screen of the first electronic display and the second display screen of the second electronic display. In this configuration, a first combination of the first display screen and the second display screen has a third aspect ratio having a third horizontal component and a third vertical component. For example, combining two 16:9 displays into a landscape configuration as discussed above may provide an 18:16 aspect ratio display, which can be referred to as a 9:8 aspect ratio display. The third horizontal component (e.g., the "18" in the 18:16 aspect ratio) combines the first vertical component of the first display screen (e.g., the "9" in 16:9) and the second vertical component of the second display screen (e.g., the "9" in the 16:9 aspect ratio). That is, the horizontal component of the combined aspect ratio 18=9+9. In this embodiment, the third vertical component (e.g., the "16" in the 18:18 aspect ratio) is equal to the first horizontal component (e.g., the "16" in 16:9) and the second horizontal component (e.g., the "16" in 16:9).

In a second configuration, the second set of releasable fasteners may be coupled such that the third edge of the first electronic display and the fourth edge of the second electronic display are touching. The intermediate region may be positioned at a backside with respect to the first display screen of the first electronic display and the second display screen of the second electronic display. In this second configuration, a second combination of the first display screen and the second display screen has a fourth aspect ratio (e.g., 32:9, as discussed above). This display has a fourth horizontal component (e.g., the "32" in 32:9) and a fourth vertical component (e.g., the "9" in 32:9). The fourth horizontal component (e.g., the "32" in 32:9) the combines the first horizontal component of the first display screen (e.g., the "16" in 16:9) and the second horizontal component of the second display screen (e.g., the "16" in 16:9). That is, the horizontal component of the combined aspect ratio is 32=16+16. The fourth vertical component (e.g., the "9" in 32:9 is equal to the first vertical component (e.g., the "9" in 16:9) and the second vertical component (e.g., the "9" in 16:9).

Figure 8:
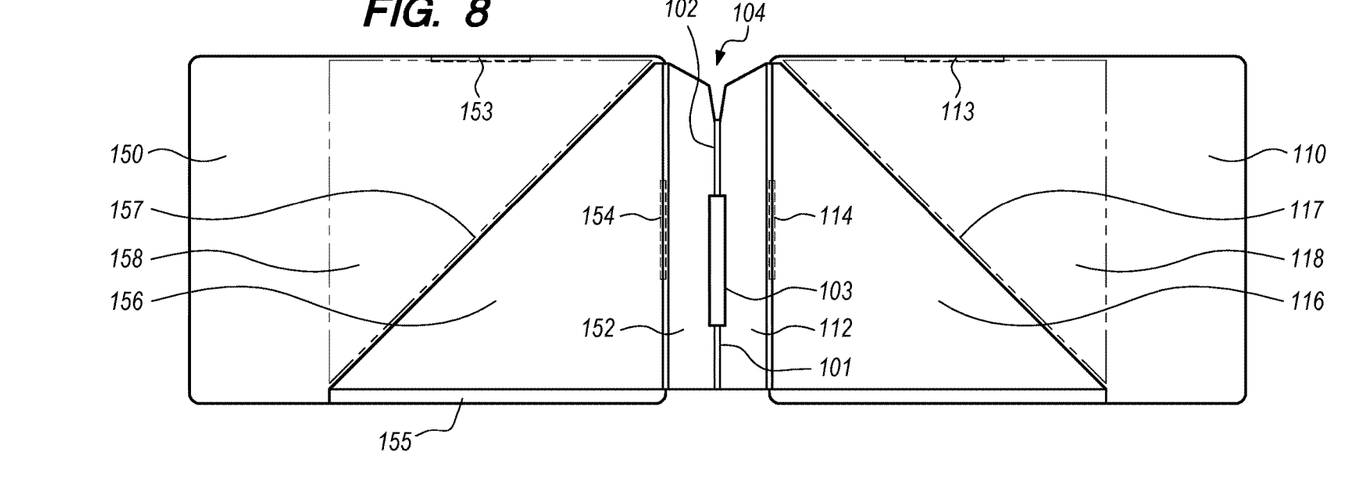
FIG. 8 illustrates a back view of the display attachment and the two electronic displays of FIG. 1 when laid flat from the panoramic configuration of FIG. 6, according to an embodiment.

FIG. 7 and FIG. 8 provide further views of the front and the back when the display apparatus is laid flat from the panoramic configuration.

FIG. 7 illustrates a front view of the display attachment and the two electronic displays 110, 150 of FIG. 1 when laid flat from the panoramic configuration of FIG. 6, according to an embodiment. As shown in FIG. 7, the second cutout region 104 of intermediate region of the display attachment is at the top side of the electronic display 110, 150 (e.g., what would be the top side when being used by a user). As shown in FIG. 7, the second set of releasable fasteners 114, 154 are configured to fasten together when moved closer together by the intermediate region and the first hinge 101 and second hinge 102.

FIG. 8 illustrates a back view of the display attachment and the two electronic displays 110, 150 of FIG. 1 when laid flat from the panoramic configuration of FIG. 6, according to an embodiment. As shown in FIG. 8, the third region 116 may be folded over the first region 115 and the second region 156 may be folded over the fourth region 155. To achieve the panoramic configuration shown in FIG. 6, first, the first hinge 101 and the second hinge 102 can be dual-axis hinges and may rotate the intermediate portion such that it is positioned between the two electronic displays, and second, the display attachment may be pulled backwards such that the display attachment is not positioned between the two electronic display 110, 150 because of the second cutout region 104. As such, the second cutout region 104 of the display attachment may be positioned against the backside of the two electronic displays, but the display attachment may not be positioned between the two electronic displays 110, 150. As discussed above, the display attachment, when pulled back as discussed above, may act as a stand for the two electronic displays 110, 150 when they are configured in the panoramic configuration.

Figure 9:
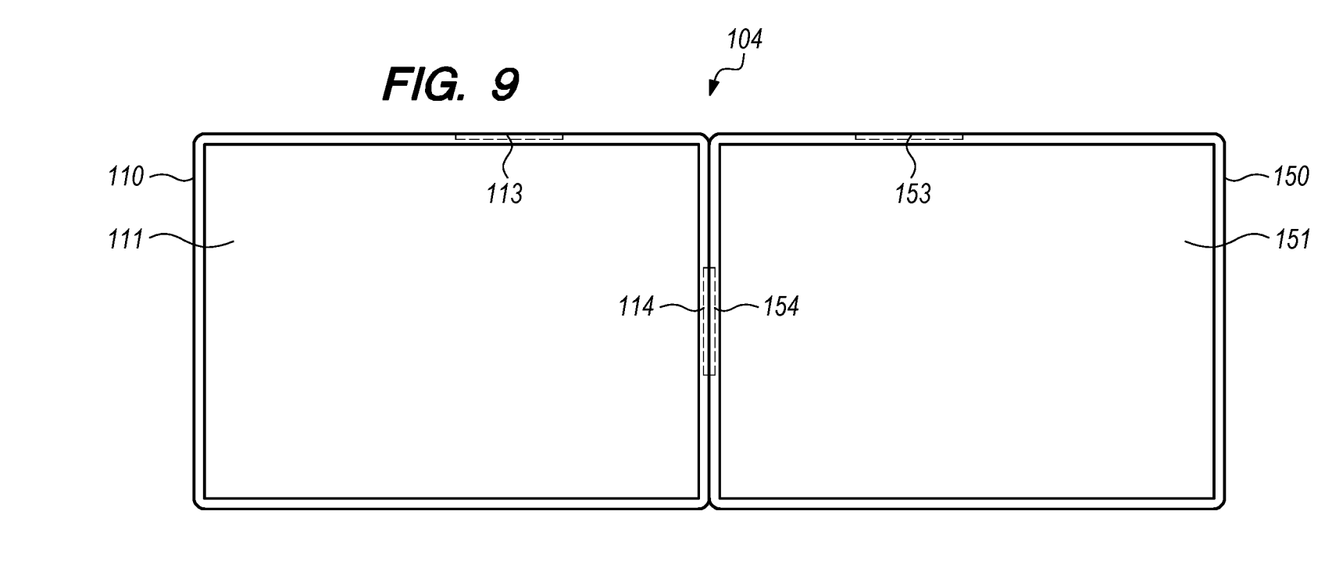
FIG. 9 illustrates a front view of the display apparatus of FIG. 6, according to an embodiment.

FIG. 9 illustrates a front view of the display apparatus of FIG. 6, according to an embodiment. As discussed above with respect to FIG. 6, the third region 116 has releasably detached from a first portion 118 of the first electronic display and the fourth region 156 has releasably detached from a second portion 158 of the second electronic display. As part of converting to the panoramic mode, the second set of releasable fasteners 114, 154 are configured to fasten together when moved closer together by the first hinge 101 and second hinge 102 of the intermediate region.

As discussed above, the second set of releasable fasteners 114, 154 are configured to releasably couple the third edge of the first electronic display 110 to the fourth edge of the second electronic display 120. In some embodiments, the second set of releasable fasteners 114, 154 may be configured similar to the first set of releasable fasteners 113, 153. In some embodiments, the second set of releasable fasteners 114, 154 may be configured different from the first set of releasable fasteners 113, 153. For example, the first set of releasable fasteners may be a different type of fastener compared to the second set of releasable fasteners. In some embodiments, the second set of releasable fasteners includes a third magnet and a fourth magnet configured to couple with the third magnet. That is, the third fastener 114 and the fourth fastener 154 may be magnets.

As shown in FIG. 9, the display attachment in the panoramic configuration does not provide or contribute to a gap between the first electronic display 110 and the second electronic display 150. As shown in FIG. 6, the display attachment is on a backside of the electronic displays 110, 150. For example, the second cutout section 104 of the display attachment prevents the display attachment from being positioned between the two electronic displays 110, 150 when the third region 116 and fourth region 156 are pulled back, away from the electronic displays 110, 150. That is, the display attachment is not positioned between the two electronic displays 110, 150 because a portion that would be positioned there has been cut out (e.g., the second cutout section 104). As shown in FIG. 6, the third region 116 and fourth region 156, along with the intermediate portion of the display attachment, may be used as a stand to hold the two electronic displays 110, 150 upright at an angle when in the panoramic configuration. Accordingly, the front view illustrated in FIG. 9 may show the two electronic displays 110, 150 as they are leaning back at an angle using the display attachment as a stand.

In some embodiments, the display attachment can be positioned and configured into a laptop configuration with one electronic display resting on a surface and another electronic display set upright at an angle.

Figure 10:
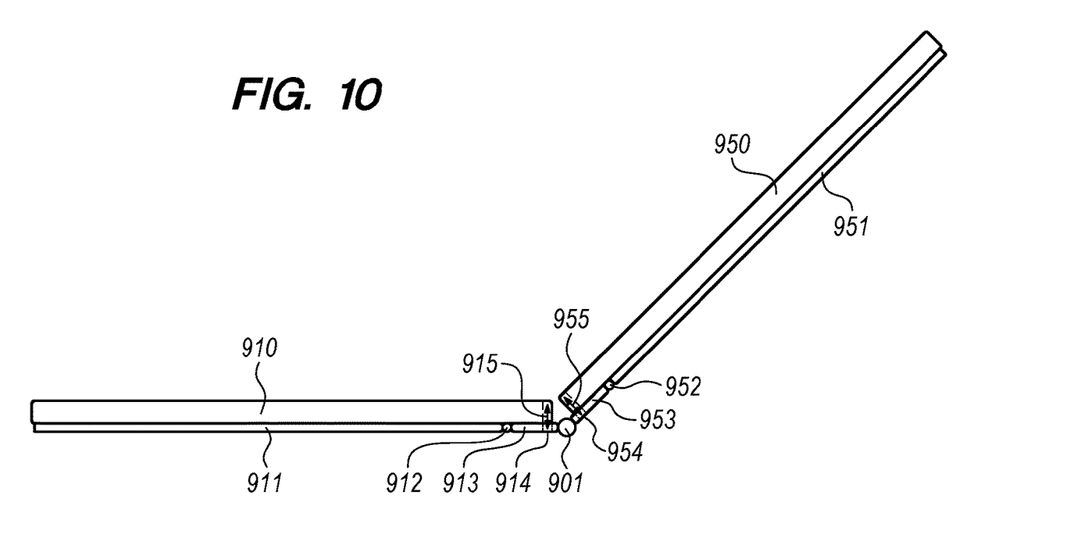
FIG. 10 illustrates a side view of another exemplary display attachment and two electronic displays in a laptop configuration, according to an embodiment.

FIG. 10 illustrates a side view of an exemplary display attachment and two electronic displays 910, 950 in a laptop configuration, according to an embodiment. In this embodiment, a first region 911 of the display attachment may be attached to a first electronic display 910. A second region 951 of the display attachment may be attached to a second electronic display 950. The display attachment may include a first hinge 901 coupled to a first intermediate region 914 and a second intermediate region 954. The second intermediate region 953 may be coupled to the second region 951 by a second hinge 952. The first intermediate region 913 may be coupled to the first region 911 by a third hinge 912.

The first intermediate region 913 may be releasably coupled to the first electronic display 910 by a first set of releasable fasteners 914, 915. The first set of releasable fasteners 915 may include a first fastener 914 in the first intermediate region 913 and a third fastener 915 in the first electronic display 910. The first set of releasable fasteners 915 may include one or more magnets, latching mechanisms, or catch mechanisms, for example.

The second intermediate region 953 may be releasably coupled to the second electronic display 950 by a second set of releasable fasteners 954, 955. The second set of releasable fasteners 914, 915 may include a second fastener 954 in the second intermediate region 953 and a fourth fastener 955 in the second electronic display 950. The second set of releasable fasteners 954, 955 may include magnets, latching mechanisms, or catch mechanisms, for example.

The first hinge 901 may be a friction hinge that provides resistance against rotation. As such, the first hinge 901 can enable the second electronic display 950 to be leaned back at an angle with respect to the first electronic display 910 such that it may be used as a laptop. In this embodiment, the first electronic display 910 may be an electronic paper display that provides a virtual keyboard and the second electronic display 950 may be an LCD or LED type display for displaying content. The second hinge 952 and the third hinge 912 may also be fiction hinges to support the laptop configuration.

In some embodiments, the dual display apparatus of FIG. 10 may be configured to convert from the laptop configuration shown in FIG. 10 to a landscape configuration similar to the one shown in FIG. 5. In such embodiments, the third fastener 915 may be further configured to releasably coupe to the fourth fastener 955 to fasten the first electronic display 910 to the second electronic display 950.

In some embodiments, the dual display apparatus of FIG. 10 may be configured to convert from the laptop configuration shown in FIG. 10 to a panoramic configuration similar to the ones shown in FIG. 6 and FIG. 9.

The embodiment shown in FIG. 10 is advantageous because it enables a dual display apparatus to be configured in both a laptop configuration and a landscape configuration, providing improved user experiences across different applications from the same dual display device.

Figure 11:
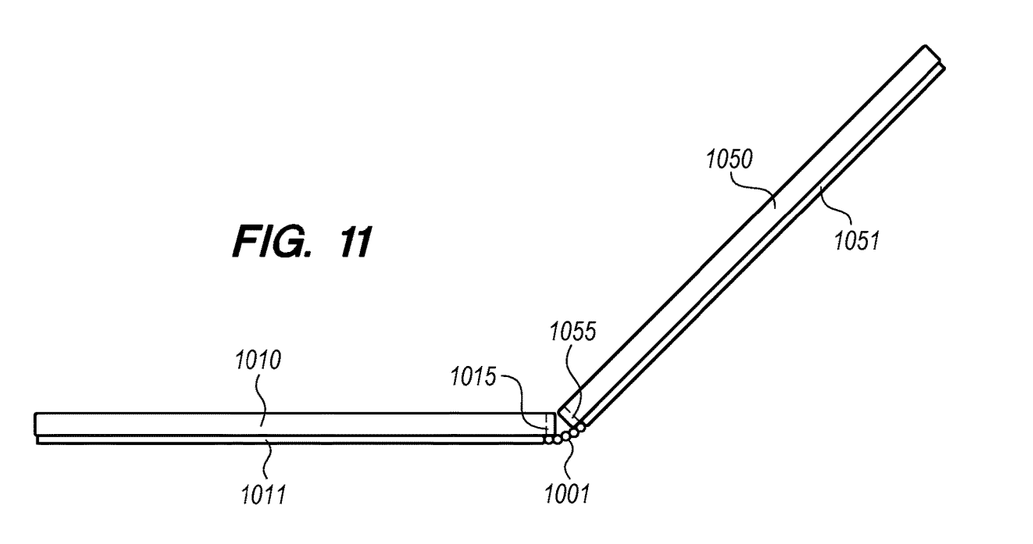
FIG. 11 illustrates a side view of another exemplary display attachment and two electronic displays in a laptop configuration using a series of hinges, according to an embodiment.

FIG. 11 illustrates a side view of another exemplary display attachment and two electronic displays 1010, 1050 in a laptop configuration using a series of hinges 1001, according to an embodiment. The embodiment of FIG. 11 may be configured similar to the embodiment of FIG. 10, except, for example, the embodiment of FIG. 11 uses a series of hinges 1001. The series of hinges may be configured such that each of the hinges is coupled to the next hinge and the previous hinge in the series (e.g., similar to how the links in a bracelet style watchband are linked together). Each of the hinges may be a friction hinge providing resistance against rotation.

In this embodiment, a first region 1011 of the display attachment may be attached to a first electronic display 1010. A second region 1051 of the display attachment may be attached to a second electronic display 1050. As discussed above, the display attachment may include series of hinges 1001. The series of hinges 1001 may be coupled to the first region 1011 and the second region 1051.

The display apparatus may include a first set of releasable fasteners 1015, 1055. The first set of releasable fasteners 1015, 1055 may include magnets, latching mechanisms, or catch mechanisms, for example. The series of hinges 1001 may be configured to move the first electronic display 1010 and the second electronic display 1050 such that the first set of releasable fasteners 1015, 1055 fasten together, thereby enabling a landscape configuration similar to the one shown in FIG. 5.

Similar to the embodiment of FIG. 10, the embodiment shown in FIG. 11 is advantageous because it enables a dual display apparatus to be configured in both a laptop configuration and a landscape configuration, providing improved user experiences across different applications from the same dual display device.

Example Hardware

Figure 12:
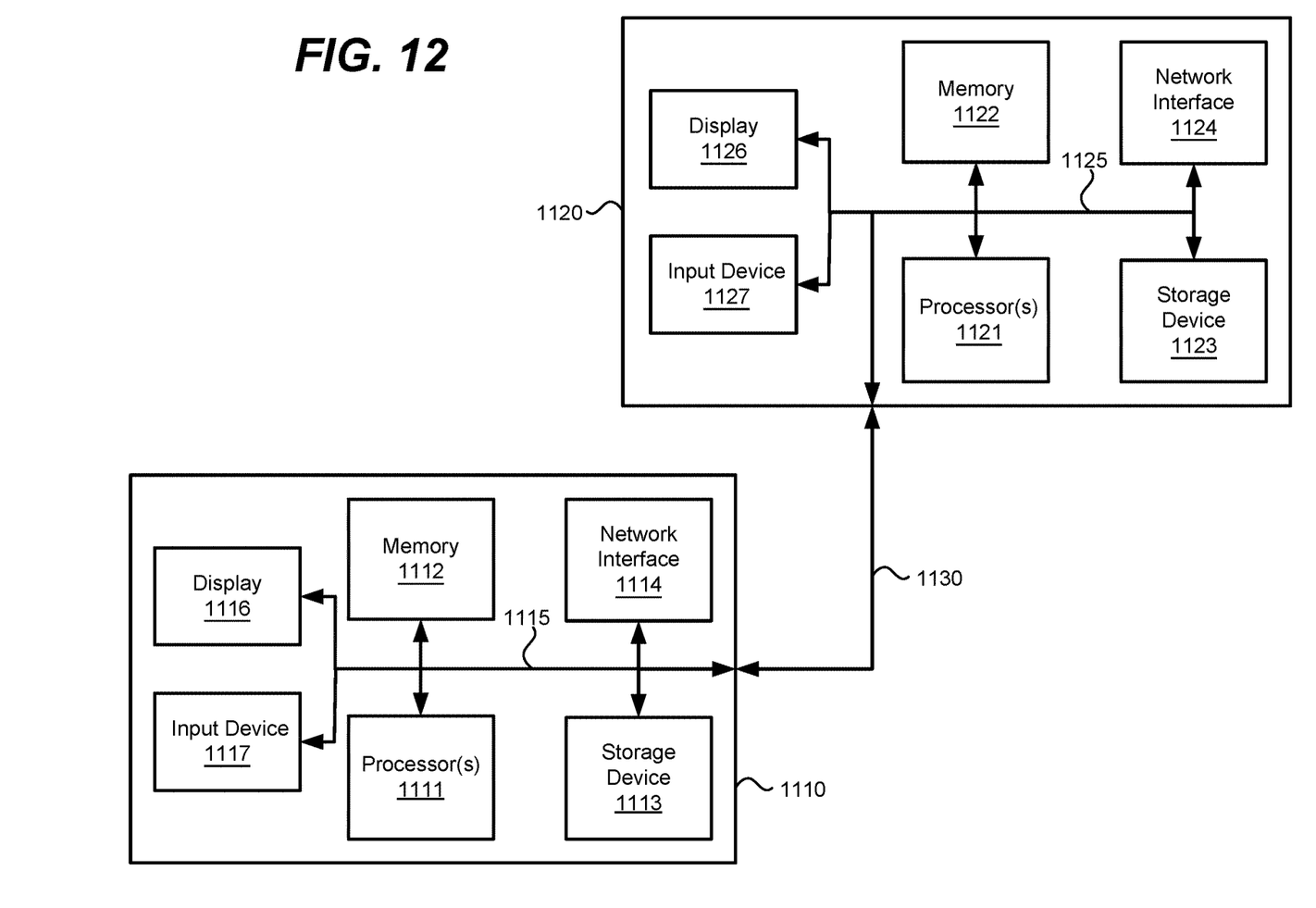
FIG. 12 shows a diagram of hardware of a special purpose computing machine for implementing the systems described herein.

FIG. 12 shows a diagram of hardware of a special purpose computing machine for implementing the systems described herein. The hardware of FIG. 11 may provide a multimodal dual display device configurable using a display attachment, as discussed above.

The following hardware description is merely one example. It is to be understood that a variety of computers topologies may be used to implement the above described techniques. A first example computer system 1110 and a second example computer system 1120 are illustrated in FIG. 11.

The first computer system 1110 includes a bus 1115 or other communication mechanism for communicating information, and one or more processor(s) 1111 coupled with bus 1115 for processing information. Computer system 110 also includes a memory 1112 coupled to bus 1115 for storing information and instructions to be executed by processors 1111, including information and instructions for performing some of the techniques described above, for example. This memory 1112 may also be used for storing programs executed by processor(s) 1111. Possible implementations of this memory may be, but are not limited to, random access memory (RAM), read only memory (ROM), or both. A storage device 1113 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 1113 may include source code, binary code, or software files for performing the techniques above, for example. Storage device and memory are both examples of non-transitory computer readable storage mediums.

The first computer system 1110 may be coupled via bus 1115 to a display 1116 for displaying information to a computer user. An input device 1117 such as a keyboard, touchscreen, and/or mouse is coupled to bus 1115 for communicating information and command selections from the user to processor 1111. The combination of these components allows the user to communicate with the system. In some systems, bus 1115 represents multiple specialized buses, for example.

The first computer system 1110 also includes a network interface 1114 coupled with bus 1115. Network interface 1114 may provide two-way data communication between computer system 1010 and a network. The network interface 1114 may be a wireless or wired connection, for example. Computer system 1010 can send and receive information through the network interface 804 across a local area network, an Intranet, a cellular network, or the Internet, for example. In the Internet example, a browser, for example, may access data and features on backend systems that may reside on multiple different hardware servers across the network. The servers may be part of a cloud computing environment, for example.

The first computer system 1110 may be coupled to the second computer system 1120 by one or more wires and/or flexible circuit boards 1130. In the embodiment shown in FIG. 11, the second computer system 1120 may be configured similar to the first computer system 1110. That is, the one or more processors 1121 of the second computer system 1120 may be configured similar to the one or more processors 1111 of the first computer system 1110. The memory 1122 of the second computer system 1120 may be configured similar to the memory 1112 of the first computer system 1110. The storage device 1123 of the second computer system 1120 may be configured similar to the storage device 1113 of the first computer system 1110. The network interface 1124 of the second computer system 1120 may be configured similar to the network interface 1114 of the first computer system 1110. The display 1126 of the second computer system 1120 may be configured similar to the display 1116 of the first computer system 1110. And the input device 1127 of the second computer system 1120 may be configured similar to the storage device 1117 of the first computer system 1110.

In some embodiments, the second computer system 1120 may be configured different from the first computer system 1110. For example, the display 1116 of the first computer system 1110 may be an electronic paper display while the display 1126 of the second computer system 1120 may be an LCD or LED display. In some embodiments, one of the first computer system 1110 or the second computer system 1120 may not include processors, memory, a networking interface, or a storage device.

As used herein, a "region" may refer to an area, part, piece, region, or a subset of an object or element. For example, a portion may refer to a particular exterior surface, interior area, side, etc. of an element. In addition, a "region" may refer to a particular area, part, piece, portion, or subset of an exterior surface, interior area, side, etc. of an object or element.

As used herein, elements or portions of elements that are "coupled" may not be directly coupled or connected to one another, but may be coupled using one or more intervening elements. For instance, "coupled" elements may or may not be directly touching one another.

As used herein, "attached" may refer to permanent, semi-permanent, or releasable attachment or one object to another. For example, "attached" objects may refer to objects that are part of the same structure, objects that are joined together, objects that are fastened together, objects that are affixed (e.g., by adhesive), or objects that are connected magnetically or electromagnetically. Objects that are attached may be detached without changing the structure of the individual objects.

As used herein, the terms "first," "second," "third," "fourth," "fifth," "sixth," "seventh," "eighth," "ninth," "tenth," etc., do not necessarily indicate an ordering or sequence unless indicated. These terms, as used herein, may simply be used for differentiation between different objects or elements.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A display apparatus, comprising:
a first electronic display;
a second electronic display;
a display attachment including a first region, a second region, and an intermediate region, wherein the first region is configured to attach to a first surface of the first electronic display, the second region is configured to attach to a second surface of the second electronic display, and the intermediate region is coupled to the first region and the second region, and wherein the first, second and intermediate regions are configured to facilitate the first and second electronic displays to swivel into a common plane, and to retract in a direction orthogonal to the plane to reduce a distance between a first edge of the first electronic display and a second edge of the second electronic display while the first and second electronic displays are in the same plane; and
a first set of releasable fasteners configured to releasably couple the first edge of the first electronic display to the second edge of the second electronic display when the first, second and intermediate regions are fully retracted to remove all distance between the first edge of the first electronic display and the second edge of the second electronic display while the first and second electronic displays are in the same plane.

2. The display apparatus of claim 1, wherein the first set of releasable fasteners includes a first magnet and a second magnet configured to couple with the first magnet.

3. The display apparatus of claim 2, wherein the first magnet is mounted on or embedded in the first edge of the first electronic display, and wherein the second magnet is mounted on or embedded in the second edge of the second electronic display.

4. The display apparatus of claim 2, wherein the first magnet and the second magnet are electromagnetic.

5. The display apparatus of claim 1, wherein the first set of releasable fasteners includes a latch mechanism or a catch mechanism.

6. The display apparatus of claim 1, wherein the first set of releasable fasteners releasably couples such that the first edge of the first electronic display is fastened flush against and in contact with the second edge of the second electronic display.

7. The display apparatus of claim 1, wherein the intermediate region of the display attachment comprises one or more hinges.

8. The display apparatus of claim 7, wherein the one of the one or more hinges includes a friction hinge having resistance against rotation.

9. The display apparatus of claim 7, wherein the one or more hinges includes a plurality of connected hinges.

10. The display apparatus of claim 1, wherein the intermediate region of the display attachment comprises a fold configured to bend.

11. The display apparatus of claim 1, wherein the intermediate region is defined by a cut-out region and is configured to support the first electronic display and the second electronic display at an angle based on the cut-out region.

12. The display apparatus of claim 1, further comprising a second set of releasable fasteners configured to releasably couple a third edge of the first electronic display to a fourth edge of the second electronic display.

13. The display apparatus of claim 1, wherein one or more of the first electronic display and the second electronic display further include a processor and a memory electronically coupled to the processor.

14. The display apparatus of claim 1, further comprising wires or flexible printed circuits electronically coupling the first display to the second display and passing through the intermediate region of the display attachment.

15. The display apparatus of claim 1, wherein the first electronic display is one of a liquid crystal display, a light-emitting diode display, an organic light-emitting diode display, and an electronic paper display, and wherein the second electronic display is one of the liquid crystal display, the light-emitting diode display, the organic light-emitting diode display, and the electronic paper display.

16. The display apparatus of claim 1, wherein one of the first electronic display and the second electronic display comprise an electronic paper display and provide an on-screen keyboard.

17. A display apparatus, comprising:
a first electronic display;
a second electronic display;
a display attachment including a first region, a second region, and an intermediate region, the first region configured to attach to a first surface of the first electronic display, the second region configured to attach to a second surface of the second electronic display, the intermediate region coupled to the first region and the second region, the intermediate region configured to change a distance between a first edge of the first electronic display and a second edge of the second electronic display; and
a first set of releasable fasteners configured to releasably couple the first edge of the first electronic display to the second edge of the second electronic display;
wherein the display attachment further includes a third region configured to releasably detach from the first surface of the first electronic display, wherein the display attachment further includes a fourth region configured to releasably detach from the second surface of the second electronic display, wherein the third region and the fourth region are configured to detach from the first surface and the second surface respectively to enable the first electronic display and the second electronic display to rotate along the third region and the fourth region respectively, wherein a second set of releasable fasteners is configured to releasably detach when the first electronic display and the second electronic display are rotated along the third region and the fourth region respectively.

18. A display apparatus, comprising:
a first electronic display;
a second electronic display;
a display attachment including a first region, a second region, and an intermediate region, the first region configured to attach to a first surface of the first electronic display, the second region configured to attach to a second surface of the second electronic display, the intermediate region coupled to the first region and the second region, the intermediate region configured to change a distance between a first edge of the first electronic display and a second edge of the second electronic display; and
a first set of releasable fasteners configured to releasably couple the first edge of the first electronic display to the second edge of the second electronic display;
wherein the first electronic display comprises a first display screen having a first aspect ratio including a first horizontal component and a first vertical component, wherein the first electronic display further comprises a third edge longer in length than the first edge of the first electronic display, wherein the second electronic display comprises a second display screen having a second aspect ratio including a second horizontal component and a second vertical component, wherein the second electronic display further comprises a fourth edge longer in length than the second edge of the second electronic display, wherein the first electronic display and the second electronic display are configurable in a plurality of configurations including:
a first configuration, wherein the first set of releasable fasteners are coupled such that the first edge of the first electronic display and the second edge of the second electronic display are touching, and wherein the intermediate region is positioned at a backside with respect to the first display screen of the first electronic display and the second display screen of the second electronic display, wherein a first combination of the first display screen and the second display screen has a third aspect ratio having a third horizontal component and a third vertical component, wherein the third horizontal component combines the first vertical component of the first display screen and the second vertical component of the second display screen, and wherein the third vertical component is equal to the first horizontal component and the second horizontal component; and
a second configuration, wherein the second set of releasable fasteners are coupled such that the third edge of the first electronic display and the fourth edge of the second electronic display are touching, wherein the intermediate region is positioned at a backside with respect to the first display screen of the first electronic display and the second display screen of the second electronic display, wherein a second combination of the first display screen and the second display screen has a fourth aspect ratio having a fourth horizontal component and a fourth vertical component, wherein the fourth horizontal component combines the first horizontal component of the first display screen and the second horizontal component of the second display screen, and wherein the fourth vertical component is equal to the first vertical component and the second vertical component.

19. A display attachment, comprising:
a first region configured to attach to a first surface of a first electronic display;
a second region configured to attach to a second surface of a second electronic display;
an intermediate region connected to the first region and the second region, wherein the first, second and intermediate regions are configured to facilitate the first and second electronic displays to swivel into a common plane, and to retract in a direction orthogonal to the plane to reduce a distance between a first edge of the first electronic display and a second edge of the second electronic display while the first and second electronic displays are in the same plane; and a first set of releasable fasteners configured to releasably couple the first edge of the first electronic display to the second edge of the second electronic display when the first, second and intermediate regions are fully retracted to remove all distance between the first edge of the first electronic display and the second edge of the second electronic display while the first and second electronic displays are in the same plane.

20. The display attachment of claim 19, wherein the first set of releasable fasteners are disposed on the intermediate region.

\* \* \* \* \*